(12) United States Patent
Yu et al.

(10) Patent No.: US 7,050,254 B1
(45) Date of Patent: May 23, 2006

(54) INTERNAL DISK DRIVE TEMPERATURE ESTIMATION

(75) Inventors: Jie Yu, Irvine, CA (US); Hasnorhafiza Husni, Selangor (MY); Jian Chen, Irvine, CA (US); Hong Wan Tham, Selangor (MY)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/056,201

(22) Filed: Feb. 11, 2005

(51) Int. Cl.
*G11B 5/02* (2006.01)
(52) U.S. Cl. ...................................................... 360/55
(58) Field of Classification Search ..................... None
See application file for complete search history.

(56) References Cited

U.S. PATENT DOCUMENTS

| 5,359,285 | A | * | 10/1994 | Hashinaga et al. ...... 324/158.1 |
| 2005/0122614 | A1 | * | 6/2005 | Yun ............................ 360/69 |
| 2005/0162769 | A1 | * | 7/2005 | Yoshida et al. ............... 360/39 |

OTHER PUBLICATIONS

Persson, Niclas, et al., "Indirect Tire Pressure Monitoring Using Sensor Fusion", Society of Automotive Engineers (SAE) paper 2002-01-1250, 2002.

* cited by examiner

*Primary Examiner*—Wayne Young
*Assistant Examiner*—Mitchell Slavitt
(74) *Attorney, Agent, or Firm*—Blakely Sokoloff Taylor & Zafman (57) ABSTRACT

Disclosed is a disk drive that provides for internal disk drive temperature estimation. The disk drive includes an actuator, a head attached to the actuator, a disk to store data, a preamplifier connected to the head to amplify read and write signals, and a processor for controlling operations in the disk drive including moving the actuator such that the head is moved to read data from and write data to the disk. The processor under the control of a program is further utilized to calculate a junction temperature ($J_{Temp}$) based on a breakthrough voltage of the preamplifier, apply a filter to the calculated $J_{Temp}$ to compensate for temperature noise, and to estimate an internal disk drive temperature based upon the filtered $J_{Temp}$.

19 Claims, 6 Drawing Sheets

INTERNAL DISK DRIVE TEMPERATURE ESTIMATION

BACKGROUND OF THE INVENTION

1. Field of the Invention

The present invention relates to disk drives. More particularly, the present invention relates to a disk drive that provides for internal disk drive temperature estimation.

2. Description of the Prior Art and Related Information

Today, computers are routinely used both at work and in the home. Computers advantageously enable file sharing, the creation of electronic documents, the use of application specific software, and electronic commerce through Internet and other computer networks. Typically, each computer has a storage peripheral such as a disk drive (e.g. a hard disk drive).

A huge market exists for hard disk drives for mass-market computer systems such as servers, desktop computers, and laptop computers. To be competitive in this market, a hard disk drive should be relatively inexpensive and embody a design that is adapted for low-cost mass production.

Typically, the main assemblies of a hard disk drive are a head disk assembly (HDA) and a printed circuit board assembly (PCBA). The head disk assembly includes an enclosure including a base and a cover, at least one disk having at least one recording surface, a spindle motor for causing each disk to rotate, and an actuator arrangement. The PCBA generally includes circuitry for processing signals and controlling operations in the disk drive.

An actuator arrangement that is commonly used in hard disk drives is a rotary actuator arrangement included as part of a head stack assembly (HSA) that includes a collection of elements of the head disk assembly. The collection typically includes certain prefabricated subassemblies and certain components that are incorporated into the head disk assembly. For example, a prefabricated head stack assembly (HSA) may include a pivot bearing cartridge, a rotary actuator arrangement, and permanent magnets and an arrangement for supporting the magnets to produce a magnetic field for a voice coil motor (VCM).

The rotary actuator arrangement of the HSA may also include a coil forming another part of the VCM, an actuator body having a bore through it, and a plurality of arms projecting parallel to each other and perpendicular to the access of the bore. The rotary actuator arrangement of the HSA may also include head gimbal assemblies (HGAs) that are supported by the arms. Each HGA includes a load beam and a head supported by the load beam. The head is positioned over a track on a recording surface of the disk to write or read data to or from the track, respectively.

Typically, the body portion and the arms of the HSA are made out of metal and form a unitary structure known as an "E block." The E block may include any number of arms, e.g., one, two, three, four, five, six, etc. However, these types of HSAs tend to have a relatively high mass since the entire unitary structure of the E block is typically made out of metal. This relatively high mass results in a corresponding high moment of inertia about the pivot axis of the HSA. Because of this high moment of inertia, in order to pivot the head of the HSA to access data from the disk, a relatively large amount of power needs to be applied to the coil of the VCM.

During operation of the disk drive, it is useful to determine the internal ambient disk drive temperature. One way of achieving this is by utilizing a heat sensing device located within the disk drive. Unfortunately, the use of an extra heat sensing device adds significant cost to the disk drive.

Other attempts have been made to estimate the internal ambient temperature of the disk drive based upon measuring pre-existing signals of the disk drive. One way that this has been done is by calculating a junction temperature ($J_{Temp}$) based upon a breakthrough voltage of the preamplifier of the HSA. In effect, this measurement is accomplished by utilizing a temperature characterization of the PN junction of the preamplifier to simulate temperature measurement. Unfortunately, this technique is very inaccurate. For example, the estimated internal ambient disk drive temperature value may be significantly off from the actual internal ambient disk drive temperature.

One particular problem with this type of estimation is that it does not take into account the additional heat that is imparted to the preamplifier as a result of the VCM moving the HSA by powering the coil. This in turn heats the E block and other components of the disk drive, and particularly imparts heat to the preamplifier, whereas the actual internal ambient disk drive temperature is not raised that significantly. Thus, current techniques do not take into account the added temperature noise resulting from the use of a VCM.

SUMMARY OF THE INVENTION

The present invention relates to a disk drive that provides for internal disk drive temperature estimation.

In one aspect, the invention may be regarded as a disk drive including an actuator, a head attached to the actuator, a disk to store data, a preamplifier connected to the head to amplify read and write signals, and a processor for controlling operations in the disk drive including moving the actuator such that the head is moved to read data from and write data to the disk. Further, the processor under the control of a program is utilized to calculate a junction temperature ($J_{Temp}$) based on a breakthrough voltage of the preamplifier, apply a filter to the calculated $J_{Temp}$ to compensate for temperature noise, and to estimate an internal disk drive temperature based upon the filtered $J_{Temp}$.

In one embodiment, the filter may be a slew rate control filter that applies a slew rate limit to the $J_{Temp}$. The processor under the control of the program may estimate the internal disk drive temperature based upon the difference of the slew rate limit filtered $J_{Temp}$ and an offset value.

In one embodiment, a voice coil motor (VCM) may be utilized to move the actuator. The processor under the control of the program may further apply a VCM temperature model to the calculated $J_{Temp}$ value, and based upon the VCM temperature model, may adjust the calculated $J_{Temp}$ value to estimate the internal disk drive temperature. Particularly, based upon the current applied to the VCM as an input, the VCM model models temperature noise associated with components of the disk drive that are reflected in the preamplifier thereby affecting the calculated $J_{Temp}$. The processor, based upon the implemented VCM temperature model, may adjust the calculated $J_{Temp}$ to estimate the internal disk drive temperature.

For example, the VCM temperature model may describe the temperature of the base of the disk drive that affects the calculated $J_{Temp}$. Further, the VCM temperature model may describe the temperature of the coil affecting the calculated $J_{Temp}$. Moreover, the VCM temperature model may describe the temperature of the E block affecting the calculated $J_{Temp}$. In one embodiment, a VCM power monitor controls a switch that activates and deactivates the filter based upon power applied to the VCM.

In another aspect, the invention may be regarded as a method to estimate an internal disk drive temperature. The method includes calculating a $J_{Temp}$ based on a breakthrough voltage of the preamplifier, applying a filter to the calculated $J_{Temp}$ to compensate for temperature noise, and estimating the internal disk drive temperature of the disk drive based upon the filtered $J_{Temp}$.

The foregoing and other features of the invention are described in detail in the Detailed Description and are set forth in the appended claims.

DETAILED DESCRIPTION

Figure 1:
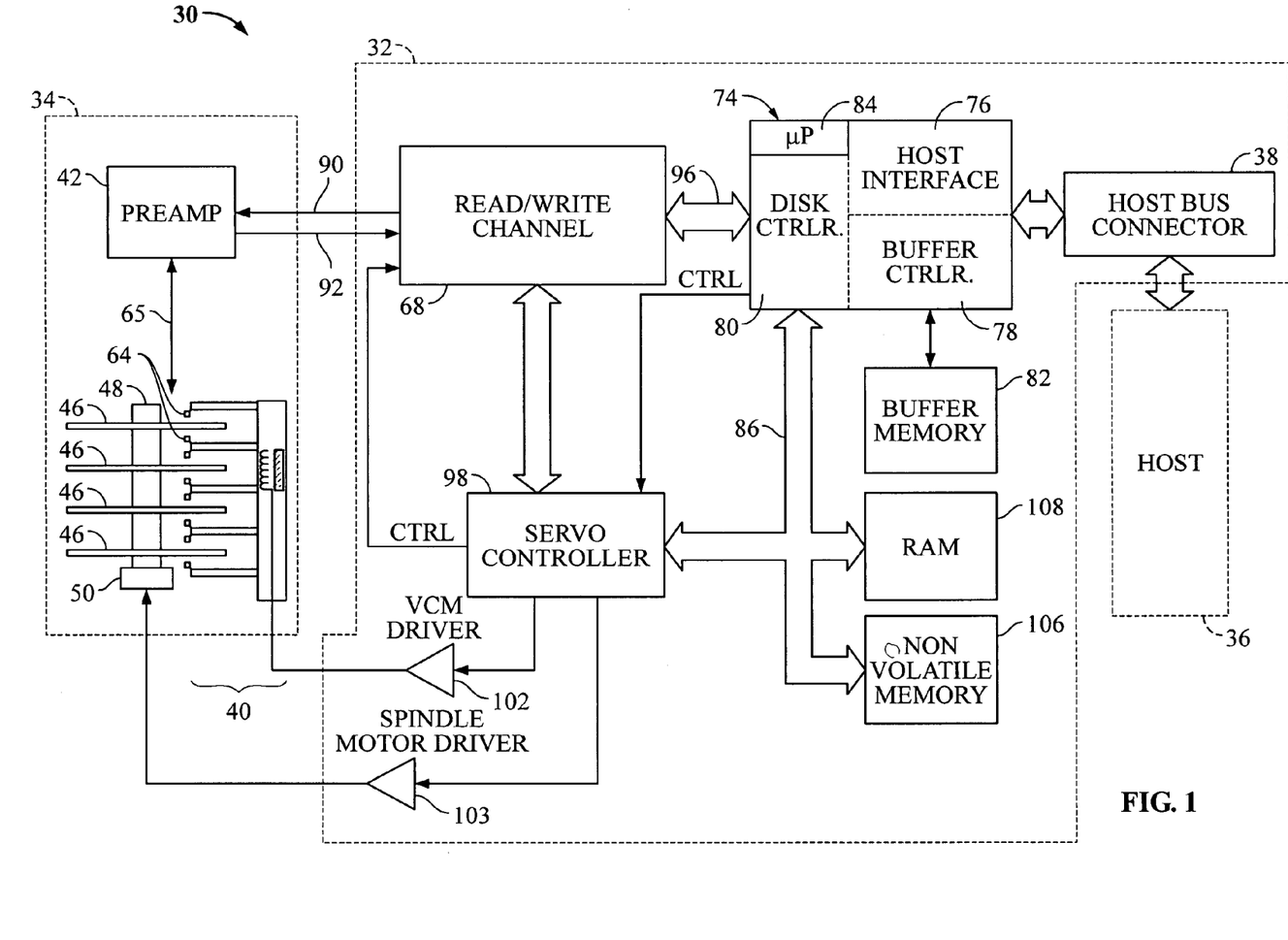
FIG. 1 shows a block diagram of a disk drive, such as an exemplary hard disk drive, in which embodiments of the invention may be practiced.

FIG. 1 shows a block diagram of a disk drive, such as a hard disk drive 30, in which embodiments of the invention may be practiced. The disk drive 30 may be connected to a host computer 36. Disk drive 30 comprises a Head/Disk Assembly (HDA) 34 and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface disk controller HIDC 74, voice coil motor driver VCM 102, spindle motor driver SMD 103, microprocessor 84, and several memory arrays— buffer or cache memory 82, RAM 108, and non-volatile memory 106.

Host initiated operations for reading and writing data in disk drive 30 are executed under control of microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques.

HIDC 74 comprises a disk controller 80 for formatting and providing error detection and correction of disk data and other disk drive operations, a host interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Disk drive 30 may employ a sampled servo system in which equally spaced servo wedge sectors (termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Particularly, the microprocessor 84 may operate under the control of a program or routine to execute methods or processes in accordance with embodiments of the invention related to internal disk drive temperature estimation. For example, such a program may be implemented in software or firmware (e.g. stored in non-volatile memory 106 or other locations) and may be implemented by microprocessor 84.

More particularly, as will be discussed in more detail later, the microprocessor 84 under the control of a program: calculates a junction temperature ($J_{Temp}$) based on a breakthrough voltage of the preamplifier 42; applies a filter to the calculate $J_{Temp}$ to compensate for temperature noise; and estimates an internal disk drive temperature based upon the filtered $J_{Temp}$.

Figure 2:
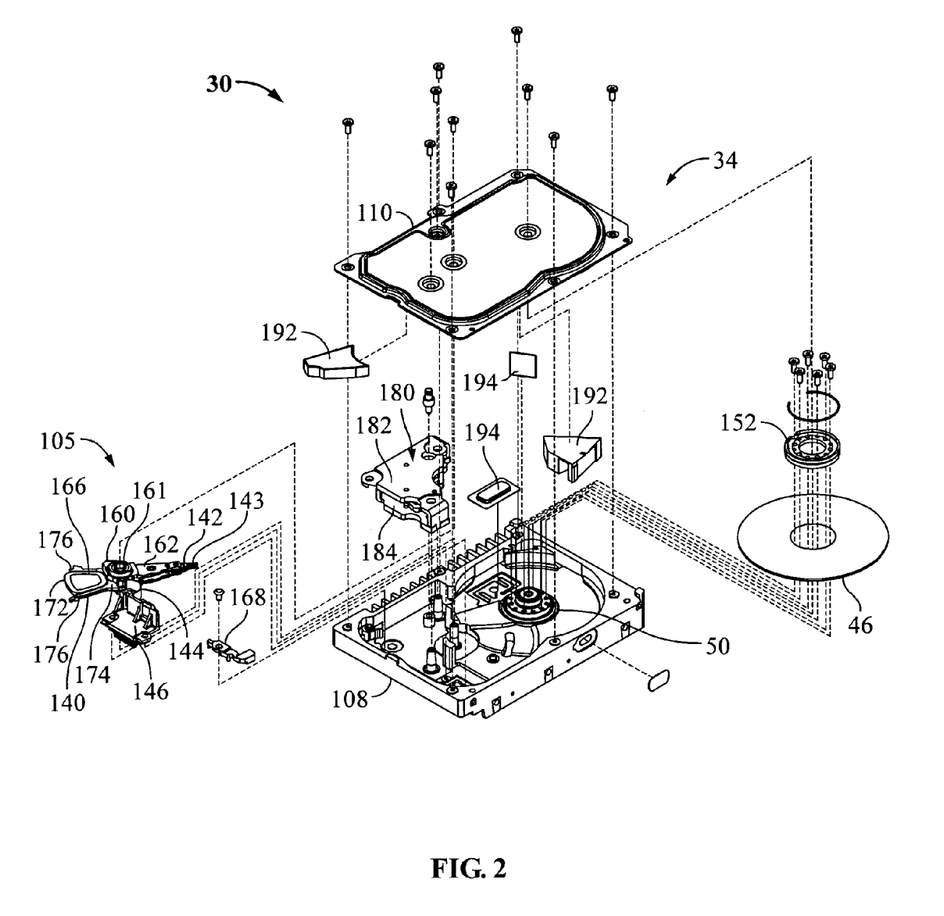
FIG. 2 is an exploded perspective view of the mechanical components of the exemplary hard disk drive.

With reference to FIG. 2, FIG. 2 is an exploded perspective view of the mechanical components of the exemplary hard disk drive (HDD) 30. The disk drive 30 includes a head disk assembly (HDA) 34 and a printed circuit board assembly (PCBA) (not shown). As previously discussed, the PCBA includes circuitry for processing signals and controlling the operations of the disk drive.

The HDA 34 includes a base 108 and a separate cover 110 attached to the base 108 to collectively house at least one disk 46, a spindle motor 50 attached to the base 108 for rotating disk 46, a head stack assembly (HSA) 105, and a pivot bearing cartridge 161 (such as a stainless steel pivot bearing cartridge, for example) that rotatably supports the HSA 105 on the base 108. The base 108 is typically attached to the separate cover 110 by means of screws or other discrete fasteners. The disk(s) 46 may be mounted to the spindle motor 50 by a disk clamp 152. The spindle motor 50 rotates the disk 46 at a constant angular velocity about a spindle motor rotation axis. Each disk utilized may include a plurality of recording surfaces for writing or reading data to or from the disk.

The HSA 105 comprises a swing-type or rotary actuator assembly 140, at least one head gimbal assembly (HGA)

142, and a flex circuit cable assembly 144 including a flex circuit cable mounted to the base 108 by a flex circuit assembly bracket 146. The rotary actuator assembly 140 includes a body portion 160 having a pivot bore for receipt of pivot-bearing cartridge 161, at least one actuator arm 162 cantilevered from the body portion 160, and a coil assembly 166 cantilevered from the body portion 160 in an opposite direction from the actuator arm 162. The actuator arm 162 supports the HGA 142 having a load beam 143 that supports a head (not shown) for writing and reading data to and from the disk 46.

The flex circuit cable assembly 144 may include preamplifier 42 that is connected through the HGAs to their respective heads, and the preamplifier may be utilized to amplify read and write signals to the heads. For example, a head can include an inductive head that is used to both read and write data on a recording surface of the disk 46, or a magnetoresistance (MR) head, which includes an MR head element to read data and an inductive element to write data.

The coil assembly 166 includes a coil 172 and a fork 174. The fork 174 is cantilevered from the body portion 160 in an opposite direction from the actuator arm 162 and includes a pair of opposed prongs 176 to mount the coil 172.

The HSA 105 is pivotally secured to the base 108 via a pivot-bearing cartridge 161 mounted through the pivot bore of the body portion 160 of the HSA 105 forming a pivot axis such that the head at the distal end of the HGA 142 may be moved over a recording surface of the disk 46. The pivot-bearing cartridge 161 enables the HSA 105 to pivot about the pivot axis. The storage capacity of the HDA 34 may be increased by the use of additional disks and by the HSA 105 having a vertical stack of HGAs supported by multiple actuator arms. Also, a latch 168 may be mounted to the base 108 in order to latch the actuator 140 when the HDD 30 is powered down.

A voice coil motor (VCM) plate assembly 180 including a top and a bottom VCM plate 182 and 184 is also mounted to the base 108. Suitably, one or both of the VCM plates includes a permanent magnet. The coil 172 of the coil assembly 166 of the actuator assembly 140 is disposed between the top and bottom VCM plates 182 and 184 in order to form a voice coil motor to cause the pivoting of the HSA 105 about the pivot axis defined by the pivot bearing cartridge 161. Thus, the voice coil motor can be used to controllably position the head(s) of the HSA relative to the disk for writing and/or reading data. As should be appreciated, multiple disks and HSA's having multiple HGA's and multiple heads may be utilized. The HDD 30 may also include additional features such as airflow diverters 192 and filters 194.

The body portion 160 and the actuator arms 162 of the HSA 105 are made out of metal and form a unitary structure known as an "E block." The E block may include any number of arms, e.g., one, two, three, four, five, six, etc. It should be appreciated that the HSA 105 may have a relatively high mass since the entire unitary structure of the E block is typically made out of metal and that this relatively high mass results in a corresponding high moment of inertia about the pivot axis of the HSA. Because of this high moment of inertia, in order to pivot the head of the HSA 105 to access data from the disk, a relatively large amount of power needs to be applied to the coil 172 and consequently a large amount of heat is generated by the coil and transferred to the E block and consequently to the preamplifier 42. Further, heat is also transferred to the base 108 and other components of the disk drive from the base.

The present invention relates to a disk drive that provides for internal disk drive temperature estimation. Particularly, the microprocessor 84 under the control of a program may be used to calculate a junction temperature ($J_{Temp}$) based on a breakthrough voltage of the preamplifier 42 and may then apply a filter to the calculated $J_{Temp}$ to compensate for temperature noise associated with the heat generated by the coil that is transferred to the E block and to other components of the disk drive and that is consequently transferred to the preamplifier 42. The processor under the control of the program may then estimate an internal disk drive temperature based upon the filtered $J_{Temp}$.

Figure 3:
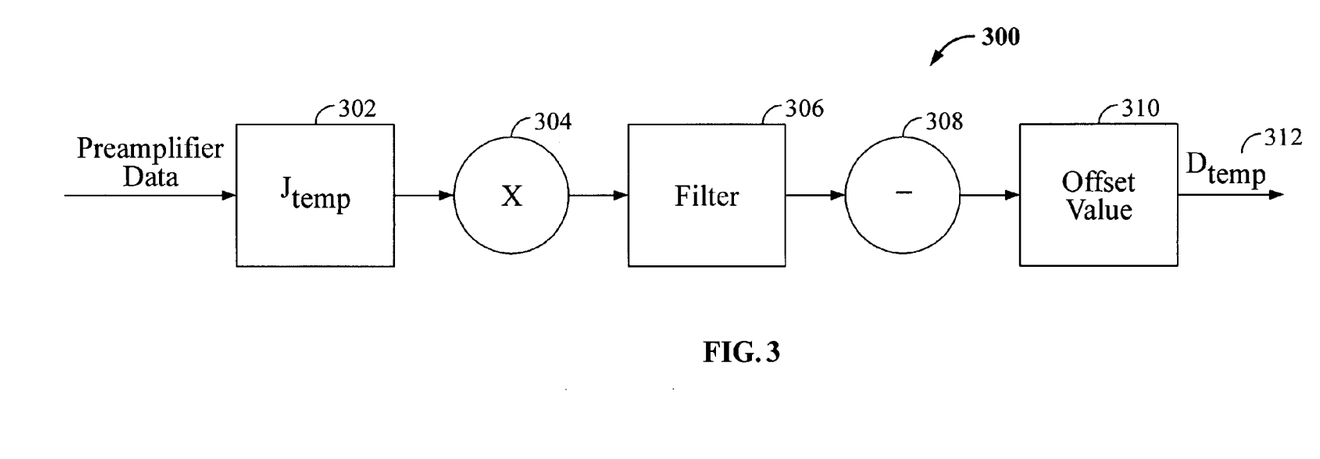
FIG. 3 is a block diagram illustrating operations to estimate the disk drive's internal ambient temperature.

Turning now to FIG. 3, FIG. 3 is a block diagram illustrating the operations implemented by the processor to estimate the disk drive's internal ambient temperature. As shown in FIG. 3, preamplifier data is utilized to calculate the junction temperature ($J_{Temp}$) at block 302 based upon the breakthrough voltage of the preamplifier. The $J_{Temp}$ value is then filtered through Filter 306 to compensate for the temperature noise. Next, an offset value 310 is subtracted 308 from the filtered $J_{Temp}$ value, which results in an estimated internal ambient disk drive temperature ($D_{Temp}$) 312.

Figure 4:
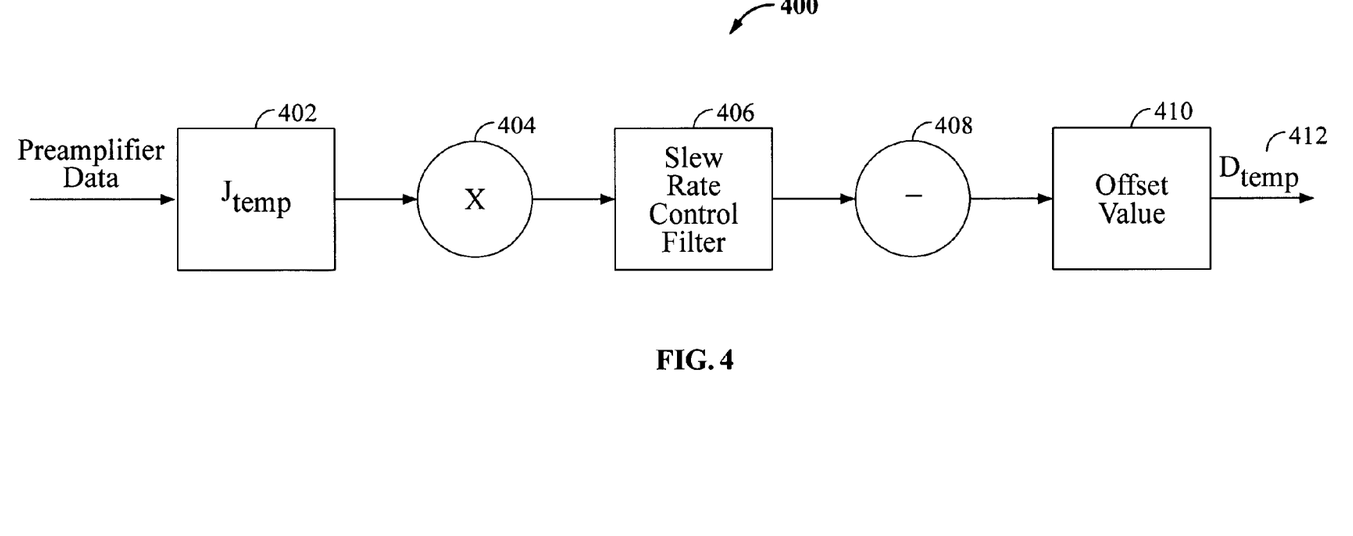
FIG. 4 is a block diagram illustrating operations to estimate the disk drive's internal ambient temperature utilizing a slew rate control filter.

With reference now to FIG. 4, FIG. 4 is a block diagram illustrating the operations implemented by the processor to estimate the disk drive's internal ambient temperature utilizing a slew rate control filter. At block 402, a $J_{Temp}$ value is calculated based on a breakthrough voltage of the preamplifier and this calculated $J_{Temp}$ value is then filtered through slew rate control filter 406 in order to compensate for temperature noise. Next, an offset value 410 is subtracted 408 from the slew rate filtered $J_{Temp}$ to produce an estimated internal ambient disk drive temperature ($D_{Temp}$) 412.

By applying a slew rate control filter in which a slew rate limit is imposed upon the calculated $J_{Temp}$ value, any sudden jump in temperature that is applied to the preamplifier is filtered out. A rapid increase in the $J_{Temp}$ value may be due to a seek operation in which the coil is being powered and the E block, base, and coil are subjected to increased heating and consequently the preamplifier is as well. This results in a $J_{Temp}$ value that is extremely disproportionate to the actual internal ambient disk drive temperature. It has been found that by applying a slew rate limit to the $J_{Temp}$ value, that the accuracy of the estimation of the internal ambient disk drive temperature is significantly increased.

Although a slew rate control filter has been provided as an example, it should be appreciated that other types of filters such as low-pass filters, adaptive filters, non-linear filters, etc., may be utilized. However, the slew rate filter has been found to be very effective. In essence, the slew rate filter imposes a physical limitation into the system, in that, it is known that the actual ambient internal temperature within the disk drive can only possibly increase by a certain value (e.g. 2° C. per minute) such that the $J_{Temp}$ value, which is indirectly based upon heat applied at the preamplifier, needs to be suitably limited. In this way, temperature noise from such things as seek operations where the E block becomes hot due to increased power being applied to the coil is filtered out.

In another embodiment, temperature noise can be further filtered by the use of a voice coil motor (VCM) thermal model that is utilized in conjunction with the previously-described slew rate control filter 406.

Figure 5:
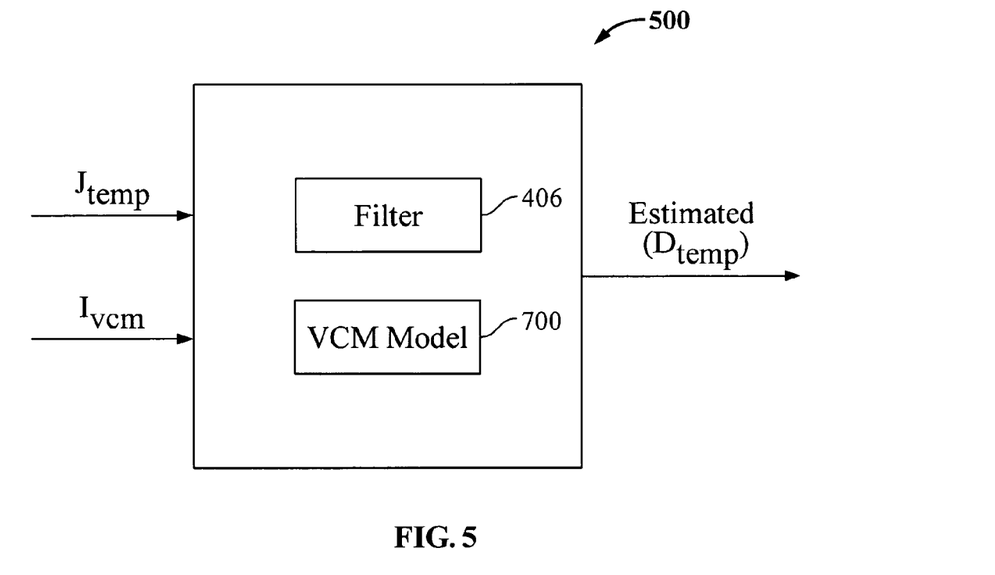
FIG. 5 is a block diagram illustrating a high-level system diagram showing disk drive temperature estimation based upon multiple input signals.

Referring now to FIG. 5, FIG. 5 is a block diagram illustrating a high-level system diagram showing disk drive temperature estimation based upon multiple input signals. Particularly, in this system 500, the estimated internal ambient temperature of the disk drive ($D_{Temp}$) is estimated based upon the $J_{Temp}$ signal and the current applied to the coil of the VCM ($I_{VCM}$) as inputs to the previously-discussed slew rate control filter 406 and a VCM model 700. Based upon this system, the internal ambient temperature of the disk drive ($D_{Temp}$) can be estimated with greater accuracy.

As previously discussed, the VCM moves the actuator to position the head over a disk. The processor under the control of a program may further apply a VCM temperature model 700 to the calculated $J_{Temp}$ value, and based upon the VCM temperature model 700, the processor may adjust the calculated $J_{Temp}$ value to more accurately estimate the internal ambient disk drive temperature ($D_{Temp}$). Particularly, based upon the current applied to the VCM as an input ($I_{VCM}$), temperature noise associated with the components of the disk drive that is transferred to the preamplifier, and that is thereby reflected in the calculated $J_{Temp}$, is modeled, and based upon the VCM temperature model 700, the processor adjusts the calculated $J_{Temp}$ to more accurately estimate the internal disk drive temperature $D_{Temp}$.

Figure 6:
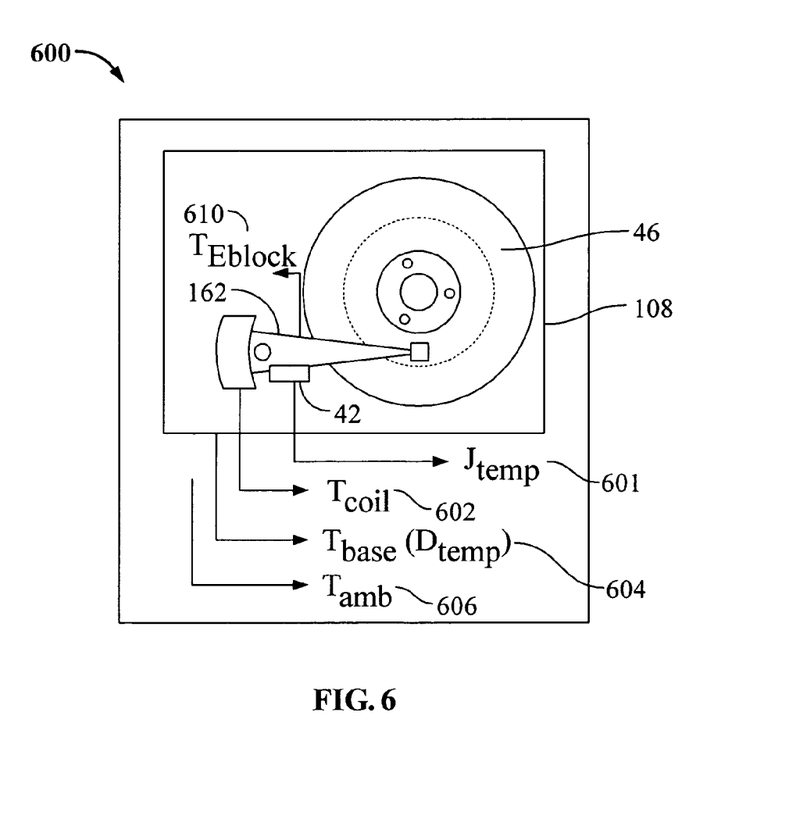
FIG. 6 is a diagram illustrating various signals that may be utilized in the VCM temperature model.

As shown in FIG. 6, various signals may be utilized in the VCM temperature model. Particularly, as shown in FIG. 6, the $J_{Temp}$ value 601 is shown as being estimated from the preamplifier 42 attached to actuator arm 162 of the E block. The actuator assembly is shown positioned next to disk 46. Further, FIG. 6 shows other components of the VCM thermal model including the $T_{E\ block}$ signal 610 representative of the temperature emanating from the E block. A $T_{coil}$ signal 602 is shown that is representative of the temperature emanating from the coil of the VCM. Further, a $T_{base}$ signal 604 is shown that is representative of the heat emanating from the base of the disk drive.

It should be appreciated that $T_{base}$ signal 604 in steady state eventually corresponds to the internal ambient temperature of the disk drive $D_{Temp}$ itself. Also, FIG. 6 shows the external ambient temperature of the disk drive shown as $T_{amb}$ signal 606. These representative signals are utilized in the VCM temperature model as will be discussed.

Figure 7:
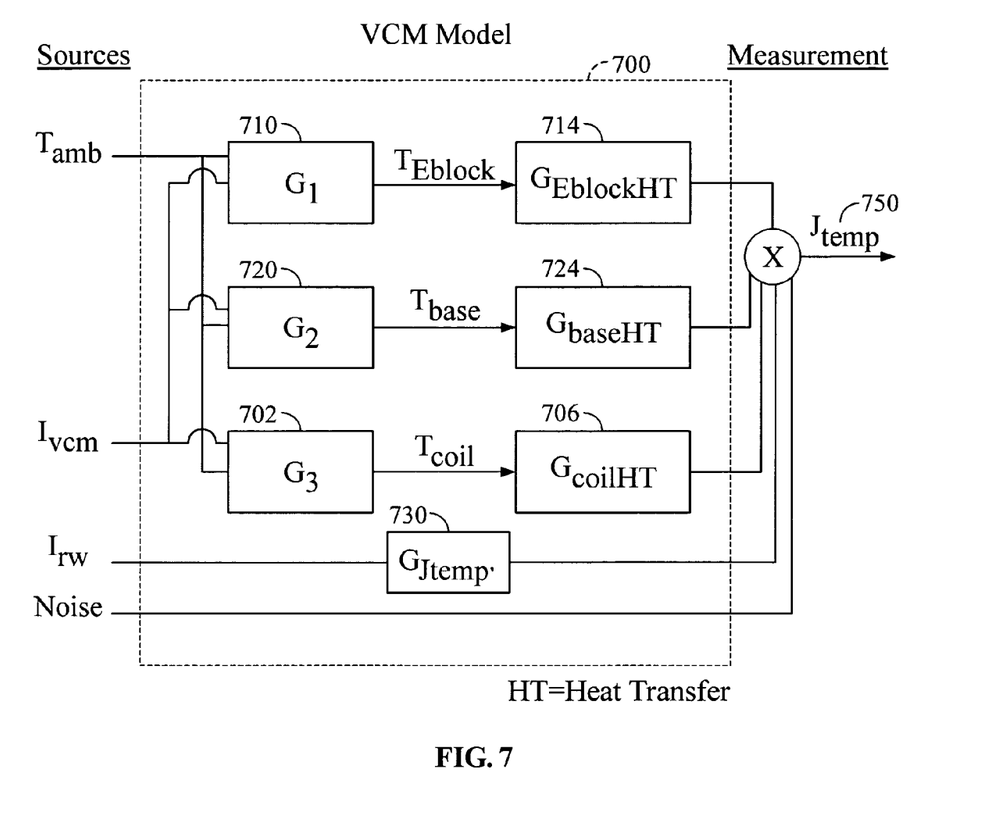
FIG. 7 is a block diagram illustrating a VCM temperature model.

As will be discussed, the VCM temperature model 700 describes the temperature of the base ($T_{base}$) as it affects the calculated $J_{Temp}$ value. Further, the VCM temperature model 700 describes how the temperature of the coil ($T_{coil}$ 602) affects the calculated $J_{Temp}$ value. And moreover, the VCM temperature model 700 describes how the temperature of the E block ($T_{E\ block}$ 610) affects the calculated $J_{Temp}$ value.

Turning now to FIG. 7, FIG. 7 shows a block diagram illustrating the VCM model 700. As shown in the VCM model 700, the $J_{Temp}$ value 750 is based upon a variety of input signals including $T_{amb}$ (the external ambient temperature of the disk drive), $I_{VCM}$ (the current applied to the coil of the voice coil motor), $I_{RW}$ (the read/write current applied to the preamplifier itself), as well as noise.

Particularly, as shown in FIG. 7, the VCM model describes the temperature of the coil ($T_{coil}$) based upon input sources $T_{amb}$ and $I_{VCM}$ and transfer function $G_3$ 702. In one embodiment, the transfer function $G_3$ 702 is described by the following equation:

$$\frac{dT_{coil}}{dt} = \frac{1}{K_{tc}}[K_{rc} \cdot P_{vcm} - K_{rce}(T_{coil} - T_{Eblock}) - K_{rcb}(T_{coil} - T_{base})]$$

In this equation, $K_{tc}$ is a thermal time constant for the coil, $K_{rc}$ is a thermal resistance constant for the coil, $P_{vcm}$ is the power applied to the coil, $K_{rce}$ is a thermal resistance constant for the E block, and $K_{rcb}$ is a thermal resistance constant for the base.

Similarly, the temperature of the base ($T_{base}$) is modeled by the VCM temperature model 700 based upon the input sources $T_{amb}$ and $I_{vcm}$ and transfer function $G_2$ 720. In one embodiment, the transfer function equation $G_2$ 720 may be described by the following equation:

$$\frac{dT_{base}}{dt} = \frac{1}{K_{tb}}[K_{rcb} \cdot (T_{Vcm} - T_{base}) + K_{reb} \cdot (T_{Eblock} - T_{base}) - K_{rba}(T_{base} - T_{amb})]$$

In this equation $K_{tb}$ is a thermal time constant for the base, $K_{rcb}$ is a thermal resistance constant for the base, $K_{reb}$ is a thermal resistance constant for the E block, and $K_{rba}$ is a thermal resistance constant for the base.

Further, the temperature of the E block may be described by the VCM temperature model 700 based upon input sources $T_{amb}$ and $I_{vcm}$ and transfer function $G_1$ 710. In one embodiment, the transfer function $G_1$ 710 may be described by the following equation:

$$\frac{dT_{Eblock}}{dt} = \frac{1}{K_{teb}}[K_{rce}(T_{coil} - T_{Eblock}) - K_{reb}(T_{Eblock} - T_{base})]$$

In this equation $K_{teb}$ corresponds to a thermal time constant for the E block, $K_{rce}$ corresponds to a thermal resistance constant for the E block, and $K_{reb}$ stands for a thermal resistance constant for the E block.

As previously discussed, the VCM temperature model also describes how these estimated temperatures ($T_{E\ block}$, $T_{base}$, and $T_{coil}$) affect the calculated $J_{Temp}$ value. For example, transfer function $G_{coilHT}$ describes how the coil transfers heat over time to the preamplifier and how this affects the $J_{Temp}$ value. Likewise, the transfer function $G_{baseHT}$ 724 describes how the base transfers heat over time to the preamplifier and how this affects the $J_{Temp}$ value. Similarly, the transfer function $G_{E\ blockHT}$ 714 describes how the E block transfers heat over time to the preamplifier and how this affects the $J_{Temp}$ value.

All of these values are utilized by the VCM model 700 to adjust the calculated $J_{Temp}$ value to more accurately estimate the internal ambient disk drive temperature. It should be appreciated that these transfer functions ($G_{E\ blockHT}$, $G_{baseHT}$, and $G_{coilHT}$) are experimentally determined functions based upon the characteristics of the components to be modeled, as should be apparent to those of skill in the art.

Further, other characterizations may also be utilized in the VCM temperature model 700. For example, based upon the input source of the read/write current ($I_{RW}$) into the preamplifier itself, transfer function $G_{Jtemp}$ 730 may be used to describe how a given amount of current applied to the preamplifier and heat generated thereby affects the $J_{Temp}$ value. This transfer function is likewise experimentally determined. Also, there is random electrical noise that is associated with the measurement of the voltage of $J_{Temp}$ that can be modeled and accounted for.

Based upon all of these previously-described transfer functions and characterizations, the VCM temperature model 700 can model temperature noise associated with the components of the disk drive that are transferred to the preamplifier thereby affecting the calculated $J_{Temp}$, and based upon the VCM temperature model 700, the calculated $J_{Temp}$ value can be accordingly adjusted to more accurately estimate the internal ambient disk drive temperature.

Figure 8:
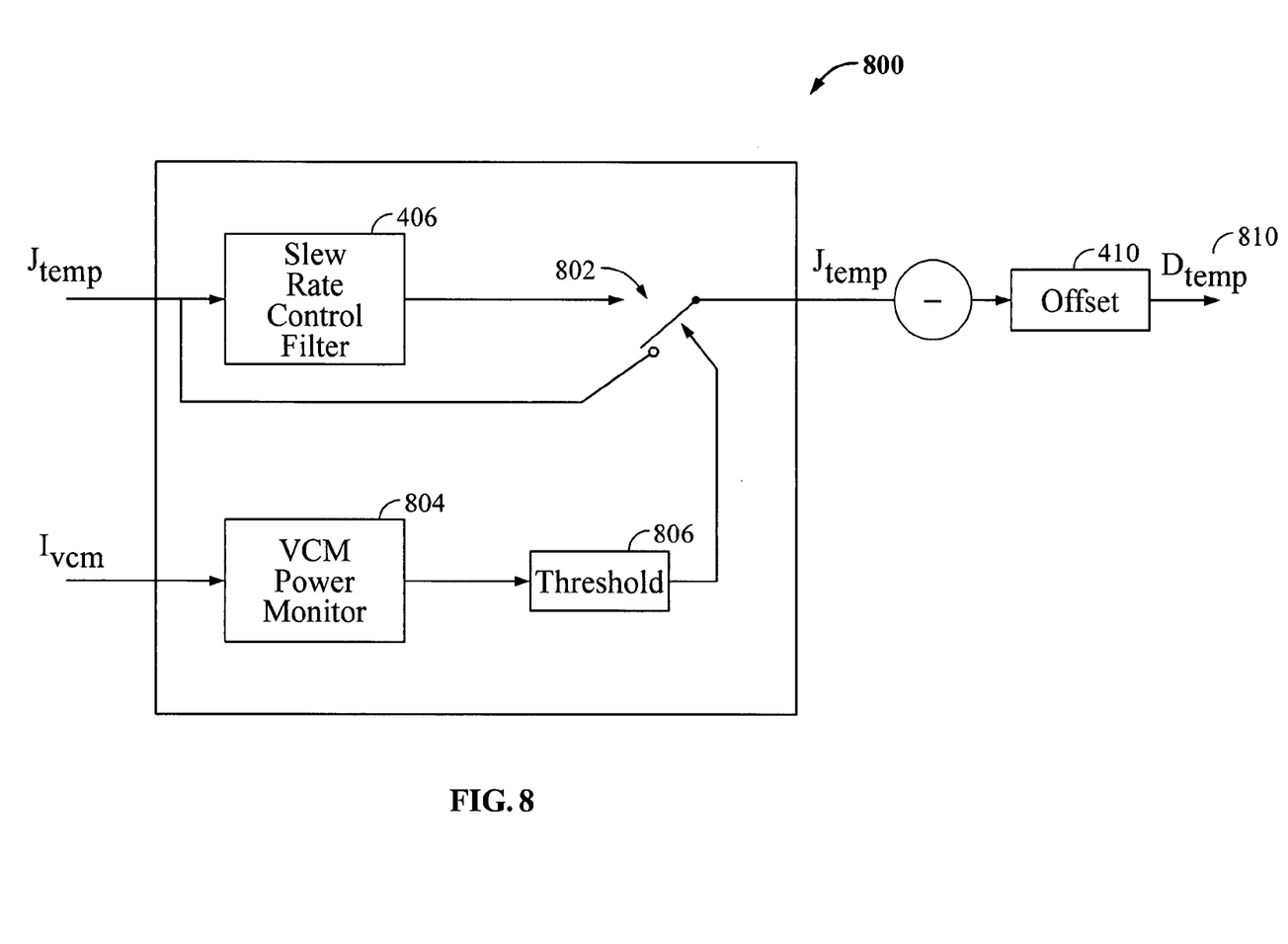
FIG. 8 is a block diagram illustrating an embodiment of the invention in which the slew rate control filter is controlled by a VCM power monitor in order to more accurately estimate the internal ambient disk drive temperature.

Now turning to FIG. 8, FIG. 8 illustrates an embodiment of the invention in which the slew rate control filter 406 is controlled by a VCM power monitor 804 in order to more accurately estimate the internal ambient disk drive temperature.

As shown in FIG. 8, in system 800, a $J_{Temp}$ value is received by slew rate control filter 406. The $J_{Temp}$ value may be a direct measurement from the pre-amplifier. The $J_{Temp}$ value may also have been adjusted to account for temperature noise associated with the components of the disk drive, as previously discussed. In this embodiment, the $J_{Temp}$ value may be filtered by slew rate control filter 406, as previously discussed, or the slew rate filter 406 may be bypassed dependent upon bypass switch 802.

Bypass switch 802 may be activated or deactivated, respectively, based upon VCM power monitor 804 and threshold activator 806. VCM power monitor 804, based upon $I_{VCM}$, may measure the amount of power applied to the VCM over a given period of time (e.g. $1/T \int I_{VCM}$) to generate an average power level. Then, threshold activator 806 will activate or deactivate bypass switch 802 dependent upon whether the measured amount of power exceeds a pre-determined threshold. For example, if the threshold is not exceeded for a period of time switch 802 may be de-activated such that a non-slew rate filtered $J_{Temp}$ value is utilized. Alternatively, if the measured amount of power does exceed a pre-determined threshold, then the switch may be activated and slew rate filtering will be applied to the $J_{Temp}$ value. In either case, the $J_{Temp}$ value has an offset value 410 subtracted from it to produce a very accurate estimated internal ambient disk drive temperature $D_{Temp}$ 810.

While embodiments of the present invention and its various functional components have been described in particular embodiments, it should be appreciated that the embodiments can be implemented in hardware, software, firmware, middleware, or a combination thereof and utilized in systems, sub-systems, components, or sub-components thereof. When implemented in software, or firmware, the elements of the embodiments of the invention are the instruction/code segments to perform the necessary tasks.

We claim:

1. A disk drive comprising:
an actuator;
a head attached to the actuator;
a disk to store data;
a preamplifier connected to the head to amplify read and write signals; and
a processor for controlling operations in the disk drive including moving the actuator such that the head is moved to read data from and write data to the disk, and the processor under the control of a program to:
calculate a junction temperature ($J_{Temp}$) based on a breakthrough voltage of the preamplifier;
apply a filter to the calculated $J_{Temp}$ to compensate for temperature noise; and
estimate an internal disk drive temperature based upon the filtered $J_{Temp}$.

2. The disk drive of claim 1, wherein the filter is a slew rate control filter that applies a slew rate limit to the calculated $J_{Temp}$.

3. The disk drive of claim 2, wherein the processor under the control of the program estimates the internal disk drive temperature based upon the difference of the slew rate limit filtered $J_{Temp}$ and an offset value.

4. The disk drive of claim 1, further comprising a voice coil motor (VCM) to move the actuator, wherein the processor under the control of the program further applies a VCM temperature model to the calculated $J_{Temp}$ value, and based upon the VCM temperature model, adjusts the calculated $J_{Temp}$ value to estimate the internal disk drive temperature.

5. The disk drive of claim 4, wherein applying the VCM temperature model further comprises, based upon current applied the VCM as an input, modeling temperature noise associated with components of the disk drive that is reflected in the preamplifier thereby affecting the calculated $J_{Temp}$, and based upon the VCM temperature model, adjusting the calculated $J_{Temp}$ to estimate the internal disk drive temperature.

6. The disk drive of claim 5, further comprising a base to mount the actuator, the VCM, and the disk.

7. The disk drive of claim 6, wherein the actuator includes a coil and an E block.

8. The disk drive of claim 6, wherein the VCM temperature model describes the temperature of the base affecting the calculated $J_{Temp}$.

9. The disk drive of claim 7, wherein the VCM temperature model describes the temperature of the coil affecting the calculated $J_{Temp}$.

10. The disk drive of claim 7, wherein the VCM temperature model describes the temperature of the E block affecting the calculated $J_{Temp}$.

11. The disk drive of claim 1, further comprising a VCM power monitor to control a switch that activates and deactivates the filter based upon power applied to the VCM.

12. In a disk drive including an actuator having a head attached thereto, a disk to store data, a preamplifier connected to the head to amplify read and write signals for reading from and writing data to the disk, a method to estimate an internal disk drive temperature comprising:
calculating a junction temperature ($J_{Temp}$) based on a breakthrough voltage of the preamplifier;
applying a filter to the calculated $J_{Temp}$ to compensate for temperature noise; and
estimating an internal disk drive temperature based upon the filtered $J_{Temp}$.

13. The method of claim 12, wherein the filter is a slew rate control filter that applies a slew rate limit to the calculated $J_{Temp}$.

14. The method of claim 13, further comprising estimating the internal disk drive temperature based upon the difference of the slew rate limit filtered $J_{Temp}$ and an offset value.

15. The method of claim 12, further comprising:
applying a voice coil motor (VCM) temperature model to the calculated $J_{Temp}$ value; and
adjusting the calculated $J_{Temp}$ to estimate the internal disk drive temperature based upon the VCM temperature model.

16. The method of claim 15, wherein applying the VCM temperature model further comprises:
based upon current applied to a VCM as an input, modeling temperature noise associated with components of the disk drive that is reflected in the preamplifier thereby affecting the calculated $J_{Temp}$; and
adjusting the calculated $J_{Temp}$ to estimate the internal disk drive temperature based upon the VCM temperature model.

17. The method of claim 16, wherein the VCM temperature model describes the temperature of a base of the disk drive affecting the calculated $J_{Temp}$.

18. The method of claim 16, wherein the VCM temperature model describes the temperature of a coil of the actuator affecting the calculated $J_{Temp}$.

19. The method of claim 16, wherein the VCM temperature model describes the temperature of an E block of the actuator affecting the calculated $J_{Temp}$.

* * * * *